United States Patent Office 3,281,335
Patented Oct. 25, 1966

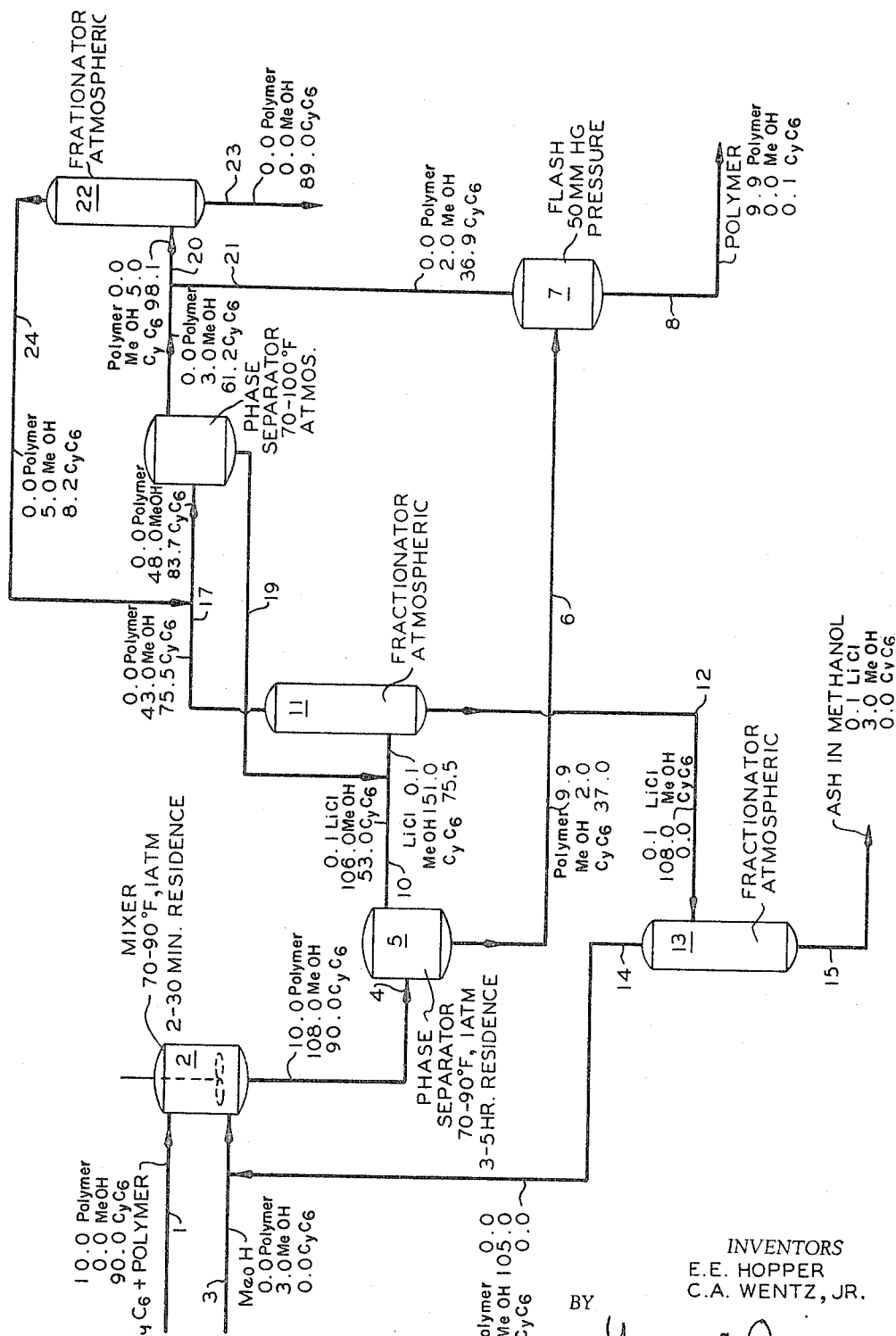

3,281,335
PURIFICATION AND RECOVERY OF CARBOXY TELECHELIC POLYMERS AND OTHER TELECHELIC POLYMERS
Charles A. Wentz, Jr., and Edward E. Hopper, Bartlesville, Okla., assignors to Phillips Petroleum Company, a corporation of Delaware
Filed Dec. 20, 1962, Ser. No. 246,033
6 Claims. (Cl. 203—39)

This invention relates to the purification and recovery of carboxytelechelic polymers, and other carboxy-terminated polymers. In another aspect it relates to the removal of lithium-containing residues from telechelic polymers.

In the formation of carboxy-telechelic polymers emplyoing an organic polyalkali metal polymerization initiator to polymerize the vinylidene compound to a polymer having an active alkali metal at at least one end thereof which is then reacted with a carbonating agent such as carbon dioxide, and the alkali metal liberated by the use of anhydrous HCl, to form the carboxy-telechelic polymer with which this invention deals, there results in the telechelic polymer-containing solution a residue of the catalyst. For example, when the catalyst is, say, 1,2-dilithio-1,2-diphenyl ethane, the residue will be essentially lithium chloride. In this manner, for example, a polymer can be obtained which has reactive corboxy groups attached to at least one, if not to each end of the polymer, molecule by using carbon dioxide to carbonate the polymer and then liberating the alkali metal by using anhydrous HCl, as stated.

Thus, the telechleic polymer product with which this invention deals is obtained in a solution in which the solvent contains the catalyst residues, say, lithium chloride, suspended therein in the form of fine or collodial particles. It is these catalyst residues, resulting from the organo alkali metal catalyst, that this invention removes, utilizing an alcohol and a combination of steps involving phase separation and azeotropic distillation and a flashing operation.

The invention here described solves a real problem since it is extremely difficult to remove the catalyst residue by filtration from the solution which, of course, contains the polymer which can be of a fairly high viscosity. Even with solutions containing a polymer such that the solution does not have a relatively high viscosity, filtration leaves much to be desired in many instances.

It is an object of this invention to provide method and apparatus for the purification and recovery of a carboxy-telechelic polymer. It is another object of this invention to provide a method for the purification and recovery of a carboxy-telechelic polymer from its solution in a hydrocarbon solvent also containing finely-divided or collodially-suspended particulate catalyst residues by utilizing effectively certain properties of certain alcohols and hydrocarbons to form azeotropic mixtures. It is a further object of the invention to provide a method and means wherein hydrocarbon solvent and alcohol used are effectively and cheaply recovered for reuse. It is a further object of the invention to cheaply remove organo-alkali metal residues from a carboxy-telechelic polymer containing a solution. Another object of the invention is to provide method and apparatus for the removal of a catalyst residue from a telechelic polymer. Other aspects, objects and the several advantages of the invention are apparent from a study of this disclosure, the drawing and the appended claims.

According to the present invention, which will now be described in connection with a specific embodiment thereof, in which a carboxy-telechelic polymer obtained from 1,3-butadiene, as later described, is purified or freed from organo-alkali metal catalyst residues and recovered, the organo-alkali metal catalyst in this instance containing as alkali metal, lithium, there is added to the solution of the carboxy-telechelic polymer in cyclohexane, methanol, whereupon the admixture, thus obtained, is caused to form at least two phases, a first phase containing alcohol, cyclohexane, and carboxy-telechelic polymer, the polymer being recovered from this phase by flashing therefrom the cyclohexane and methanol, and a second phase containing essentially no polymer but containing alcohol, some cyclohexane, and lithium chloride, said second phase being subjected to fractionation to separate therefrom an alcohol-lithium chloride-containing fraction from which the alcohol is fractionated and recovered for reuse and a cyclohexane-methanol azeotrope which is further processed by phase separation and fractionation to obtain cyclohexane which can be reused and an azeotrope which is recycled to said further phase separation.

The phase separation can be accomplished, as desired, and in the embodiment described in connection with the drawing, settling is employed.

In order that one skilled in the art may better understand the description of the drawing, it is now preceded with background information suitably related to such description.

The term "telechelic" has been coined to define the terminally reactive polymers. As used in this specification and in the claims, telechelic ployners means polymers of vinylidene-containing monomers which contain a reactive group on each end of the polymer molecule. Polymers in which a terminally reactive group is present on only one of the polymer chain are designated as "semi-telechelic" polymers. Such polymers can be prepared by various methods including polymerization of vinylidene-containing monomers in the presence of an organo alkali metal catalyst. This invention is illustrated with those telechelic polymers which contain terminal carboxy groups, to be designated as "carboxy-telechelic" polymers.

Briefly, for purposes of the present disclosure and one skilled in the art reading the same, the following is noted:

The preferred monomers are the conjugated dienes containing from 4 to 12 carbon atoms and preferably 4 to 8 carbon atoms, such as 1,3-butadiene, isoprene, piperylene, methylpentadiene, phenylbutadiene, 3,4-dimethyl-1,3-hexadiene, 4,5-diethyl-1,3-octadiene, etc. In addition, conjugated dienes containing reactive substituents along the chain can also be employed, such as for example, halogenated dienes, such as chloroprene, fluoroprene, etc. Of the conjugated dienes, the preferred material is butadiene, with isoprene and piperylene also being especially suitable. Conjugated dienes can be polymerized alone or in admixture with each other.

In addition to the conjugated dienes we can practice our invention with other monomers containing a $CH_2=C<$ group such as the vinyl-substituted aromatic compounds. Examples of these compounds include styrene, 3-methylstyrene, 3,5-diethylstyrene, 1-vinylnaphthalene, 2-vinylnaphthalene, and the like. Certain polar monomers can also be employed such as vinylpyridines, vinylquinolines, acrylic and alkacrylic acid esters, and nitriles. Specific examples of these compounds include 2-vinylpyridine, 4-vinylpyridine, 3,5-diethyl-4-vinylpyridine, 5-methyl-2-vinylpyridine, 2-vinylquinoline, 3-methyl-4-vinylquinoline, methyl acrylate, ethyl acrylate, methyl methacrylate, acrylonitrile, and methacrylonitrile. These monomers can be used to form homopolymers or copolymers, including block copolymers, with each other or with conjugated dienes.

The polymers to which our invention may be applied are prepared by contacting the monomer with an organo alkali metal compound. While compounds containing only one alkali metal atom per molecule, such as n-butyllithium are suitable and will produce mono-terminally reactive polymer, that is polymer containing a reactive group on only one end of the polymer chain, it is preferred that an organo polyalkali metal compound be employed, for example, containing 2 to 4 alkali metal atoms. This method of removing alkali-metal containing residues is particularly applicable to polymer which has been prepared using initiators containing 2 alkali metal atoms.

The organo polyalkali metal compounds can be prepared in several ways, for example, by replacing halogens in an organic halide with alkali metals, by direct addition of alkali metals to a double bond, or by reacting an organic halide with a suitable alkali metal compound.

The organo polyalkali metal compound initiates the polymerization reaction, the organo radical being incoporated in the polymer chain and the alkali metal atoms being attached at each end of the polymer chain. The polymers in general will be linear polymers having two ends; however, polymers containing more than two ends can be prepared. The general reaction can be illustrated graphically as follows:

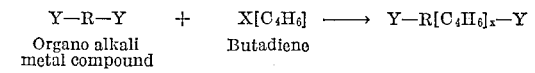
Organo alkali metal compound    Butadiene or

or combinations thereof.

A specific example is:

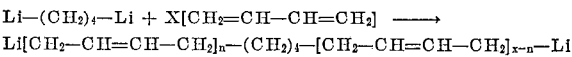

In the specific example, 1,4-addition of butadiene is shown; however, it should be understood that 1,2-addition can also occur.

While organo compounds of the various alkali metals can be employed in carrying out the polymerization, by far the best results are obtained with organolithium compounds which give very high conversions to the terminally reactive polymer. With organo compounds of the other alkali metals, the amount of mono-terminally reactive polymer, that is, polymer having alkali metal at only one end of the chain is substantially higher. The alkali metals, of course, include sodium, potassium, lithium, rubidium and cesium. The organic radical of the organo polyalkali metal compound can be an aliphatic, cycloaliphatic or aromatic radical.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 1000 millimoles per 100 grams of monomer.

Formation of the terminally reactive polymers is generally carried out in the range of between −100 and +150° C., preferably between −75 and +75° C. The particular temperatures employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 30 millimoles per 100 grams of monomers. The polymerization is generally carried out in the presence of a suitable diluent, such as cyclophentane, methylcyclopentane, cyclohexane, methylcyclohexane, n-pentane, isopentane, n-hexane, n-butane, n-heptane, isooctane, n-decane, and the like. Generally, the diluent is selected from hydrocarbons, e.g., paraffins, cycloparaffins, containing from 4 to 10 carbon atoms per molecule. As stated previously, the organolithium compounds are preferred as initiators in the polymerization reaction since a very large percentage of the polymer molecules formed contain two terminal reactive groups, and also the polymerization can be carried out at normal room temperatures.

The polymer thus formed is in solution in one of the above-mentioned solvents. This solution can be reacted directly with desired treating, e.g., carbon dioxide. It is sometimes desirable to dilute or concentrate the solution in order to obtain the best viscosity conditions for the carbonation step. The most desirable polymer concentration depends upon the molecular weight of the polymer, and the type of polymer can readily be determined. Extremely dilute solutions can be treated but practical considerations concerning the handling of large quantities of solutions make it desirable to use solutions containing at least about 3 weight percent polymer. As explained above, the molecular weight of the polymer can range from 1000 to 150,000 or higher, although usually liquid-polymers having molecular weights less than 20,000 are employed. The concentration of the polymer in solution ordinarily is not over 20 weight percent.

The temperature of the carbonation reaction should be maintained below 60° F. and preferably at about 40° F. or below. This temperature is best obtained by cooling the solution to about −60 to 60° F. and preferably below 40° F. before introducing it into the reactor.

The polymer is then treated with a suitable reagent, such as an anhydrous HCl to convert the metal salt groups to carboxy groups. The reactions which take place are typified by the following equation, wherein P designates a polymer chain.

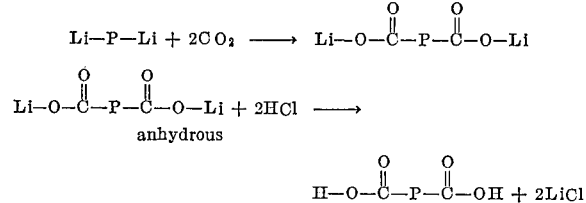

The amount of methanol employed will depend upon the concentration of the polymer solution and the diluent used in the polymerization. The invention resides in the removal of lithium-containing material from a telechelic polymer solution by washing the polymer solution with an amount of methanol sufficient to dissolve the lithium-containing material, but insufficient to coagulate the polymer, and to provide methanol and polymer solution phases of sufficient difference in density that phase separation readily occurs. When the polymerization diluent is cyclohexane and when it is used in amount to give a polymer concentration of around 5 to 10 weight percent, the amount of methanol required for optimum results is in the range of 60 to 100 volumes per 100 volumes of polymer solution based on the cyclohexane. Generally, the alcohol wash is conducted at a temperature below the B.P. of the alcohol, preferably in the range of 50–125° F. for methanol.

The method of this invention is particularly applicable to telechelic polymers of relatively low molecular weight, i.e., 30,000 and below, frequently around 5,000, and is of special interest for the treatment of carboxy-telechelic polymers. Methanol is an agent for the removal of lithium compounds, which, if left in the polymer, would appear as ash in the finished product. The process is carried out under essentially anhydrous conditions and products of unusually low ash content are obtained. Lithium compounds are removed from polymers down to around 0.05 weight percent or less, and in many instances analysis has shown the absence of lithium-containing residues.

The following examples serve to further characterize the type of solution with which this invention is concerned and from which the interrelated steps of the invention remove the organo alkali metal residue, for example, lithium chloride, wherein the alkali metal in the initiator has been lithium.

*Example I*

1,3-butadiene was polymerized in accordance with the following recipe:

| | Parts by weight |
|---|---|
| 1,3-butadiene | 100 |
| Toluene | 860 |
| 1,2-dilithio-1,2-diphenylethane (30 mmols) | 5,82 |
| Temperature, °F. | 122 |
| Time, hours | 1 |

Three runs were made. Polymerization was effected in 12-ounce bottles. Toluene was charged first, after which the bottles were purged with prepurified nitrogen for 5-minutes at the rate of 3 liters per minute. Butadiene was introduced followed by the 1,2-dilithio-1,2-diphenylethane.

The initiator employed in the foregoing polymerizations was prepared in accordance with the following recipe:

| | Parts by weight |
|---|---|
| Diethyl ether, ml. | 130 |
| Tetrahydrofuran, ml. | 70 |
| Trans-stilbene (1,2-diphenylethylene) mol | 0.4 |
| Lithium wire, gram atoms | 1.2 |
| Temperature, °F. | 122 |
| Time, hours | 1 |

Concentration of the solution was 0.2 molar.

*Example II*

Butadiene was polymerized at 50° F. to quantitative conversion in one hour. The following recipe was employed.

| | |
|---|---|
| 1,3-butadiene, parts by weight | 100 |
| Cyclohexane, parts by weight | 780 |
| 1,2-dilithio-1,2-diphenylethane, millimols | 50.0 |

Polymerization was effected in a one-gallon reactor. Cyclohexane was charged first, after which the reactor was purged with prepurified nitrogen for 30 minutes at the rate of 3 cu. ft./hour. 1,2-dilithio-1,2-diphenylethane was added, the mixture was heated to 50° C., and butadiene was pressured in at 16 ml./minute. The temperature was controlled at 50° C.

*Example III*

A polymerization initiator, an adduct of lithium with transstilbene 1,2-dilithio-1,2-diphenylethane), was prepared in a 50-gallon glass-lined tank equipped with an agitator. The recipe for preparing this adduct was as follows:

| | Parts by weight |
|---|---|
| Trans-stilbene (1,2-diphenylethylene) | 100 |
| Lithium shot | 7.8 [1] |
| Diethyl ether | 1185 |
| Tetrahydrofuran | 165 |

[1] 50% excess added.

The diethyl ether, tetrahydrofuran, and stilbene were charged, lithium was added, and the suspension was heated to 120° F. with agitation for one hour and then cooled to room temperature.

Polymerizations were carried out in an 80-gallon reactor in accordance with the following recipe:

| | |
|---|---|
| 1,3-butadiene | 100 |
| Toluene | 1000 |
| 1,2-dilithio-1,2-diphenylethane | Variable |
| Polymerization temperature, °F. | 122 |
| Time, hours | 1.0 |
| Conversion, percent | 100 |

Charge order: Toluene, heat to polymerization temperature, butadiene, initiator.

When 100 percent conversion was reached, the polymerization mixture was cooled to carbonation temperature.

Immediately following the polymerization, the unquenched reaction mixture was carbonated. The following example describes how this was done:

*Example IV*

Into a ¼ inch I.D. T-tube, there was fed, respectively, into separate arms of the tube, carbon dioxide, under a pressure of 15–18 p.s.i.g. and polymer solution. An instantaneous reaction occurred upon contact of carbon dioxide with the lithium-containing polymers. The reaction mixture thus obtained was transferred to an open vessel through the third arm of the tube. The polymer solution was transferred from the polymerization bottle into the T-tube by nitrogen under a pressure of 20 pounds p.s.i.g. Carbonated polymer in the form of a very finely divided gel, having the appearance of snow, was treated with anhydrous hydrochloric acid to free carboxy n-groups and the excess anhydrous acid was vented.

The treatment with the HCl liberated the lithium in the form of lithium chloride, thus yielding a solution which is representative of the solutions with which this invention is concerned.

The use of a T-tube to effect the carbonation with carbon dioxide of a solution of a polymer of a vinylidene-containing monomer and having at least one terminal alkali metal atom under conditions of turbulent flow whereby instantaneous mixing of said carbon dioxide and solution occurs, and immediately withdrawing the resulting mixture from the zone of turbulent contacting is set forth, described and claimed in copending application, Serial No. 50,310, filed August 18, 1960, James N. Short.

Referring now to the drawing, which indicates by weight the telechelic carboxy polymer:methanol:cyclohexane ratios, the polymer solution is passed by 1 into mixer 2, in which it is admixed with methanol introduced by 3. The admixture, thus produced, is passed by 4 to phase separator 5 which, in the embodiment here detailed, retains the admixture for a time in the approximate range of 3 to 5 hours at a temperature from about 70 to about 90° F. at approximately atmospheric pressure following which there is withdrawn by 6 to flash vessel 7 a lower phase containing the carboxy telechelic polymer, alcohol and cyclohexane. From flash vessel 7, there is withdrawn by 8 and recovered, the purified carboxy telechelic polymer.

Overhead from phase separator 5 passes by 10 into atmospheric fractionator 11, bottoms from which contain essentially alcohol and lithium chloride residue from the catalyst. The bottoms are passed by 12 to atmospheric fractionator 13, from which methanol is taken overhead by 14 for reuse in mixer 2. Bottoms from fractionator 13 are withdrawn by 15 and consist essentially of lithium chloride in methanol. Overhead from fractionator 11 passes by 17 to a second phase separator 18 from which a lower phase obtained is passed by 19 into fractionator 11 for further fractionation and distribution of its components by way of fractionator 11, as one skilled in the art of azeotropic distillation will understand. The upper phase from phase separator 18 passes by 20 together with overhead from flash vessel 7, joining it by 21, into azeotropic fractionator 22, bottoms from which are essentially cyclohexane, withdrawn by 23. Overhead from fractionator 22 passes by 24 into admixture with the material entering phase separator 18 for further treatment and distribution there, as one skilled in the art of azeotropic distillation involving phase separation will understand.

Phase separator 18 is operated at a temperature in the approximate range of from about 70 to about 100° F. and the phase is formed in a time within the approximate range of from five to ten minutes.

It will be understood by one skilled in the art in possession of this disclosure that more than one phase separator and/or fractionator can be employed in lieu of any phase separator and/or fractionator shown in the drawing. Accordingly, continuous operation is within the scope of the invention.

The phase separation can be accomplished by other means or method, for example, as by centrifugation, as earlier noted.

Included among the solvents which can be used according to the invention and which form azeotropes with methanol are:

Heptane
Hexane
Octane
Cyclohexane
Methyl-cyclohexane
Methyl-cyclopentane
Isoparaffins corresponding to the paraffins listed here The extractant of the invention should, of course, not react with, say, the carboxy group of the carboxylic polymer under the conditions of operation when esterification or other reaction is desired to be avoided.

Reasonable variation and modification are possible within the scope of the foregoing disclosure, the drawing, and the appended claims to the invention.

We claim:

1. A method for the purification and recovery of a carboxy telechelic polybutadiene from its solution in cyclohexane, the solution also containing lithium chloride catalyst residue, which comprises:
    (a) admixing methanol with said solution;
    (b) forming separate phases, a first phase containing said carboxylated polybutadiene, cyclohexane and methanol, and a second phase containing cyclohexane, methanol and catalyst residue;
    (c) flashing the first phase to obtain cyclohexane and alcohol as a vaporous fraction, and said carboxylated polybutadiene, which is recovered as product of the method; and
    (d) fractionating the second phase to recover, as a vapor, an azeotrope containing methanol and cyclohexane, and a liquid containing methanol, lithium chloride and a small unavoidable portion of carboxylated polybutadiene.

2. A method for the purification and recovery of a carboxy telechelic polybutadiene from its solution in cyclohexane, the solution also containing lithium chloride catalyst residue, which comprises:
    (a) admixing methanol with said solution;
    (b) forming separate phases, a first phase containing said carboxylated polybutadiene, cyclohexane and methanol, and a second phase containing cyclohexane, methanol and catalyst residue;
    (c) flashing the first phase to obtain cyclohexane and alcohol as a vaporous fraction, and said carboxylated polybutadiene, which is recovered as product of the method;
    (d) fractionating the second phase to recover, as a vapor, an azeotrope containing methanol and cyclohexane, and a liquid containing methanol, lithium chloride and a small unavoidable portion of carboxylated polybutadiene; and
    (e) further fractionating said liquid to recover methanol as a vapor and an unvaporized liquid containing lithium chloride catalyst residue and said unavoidable portion of carboxylated polybutadiene.

3. A method for the purification and recovery of a carboxy telechelic polybutadiene from its solution in cyclohexane, the solution also containing lithium chloride catalyst residue, which comprises:
    (a) admixing methanol with said solution;
    (b) forming separate phases, a first phase containing said carboxylated polybutadiene, cyclohexane and methanol, and a second phase containing cyclohexane, methanol and catalyst residue;
    (c) flashing the first phase to obtain cyclohexane and alcohol as a vaporous fraction, and said carboxylated polybutadiene, which is recovered as product of the method;
    (d) fractionating the second phase to recover, as a vapor, an azeotrope containing methanol and cyclohexane, and a liquid containing methanol, lithium chloride and a small unavoidable portion of carboxylated polybutadiene;
    (e) further fractionating said liquid to recover methanol as a vapor and an unvaporized liquid containing lithium chloride catalyst residue and said unavoidable portion of carboxylated polybutadiene;
    (f) subjecting said vapor, obtained at (d) hereof to a first condensation and then to a second phase separation, obtaining a third phase containing a large preponderance of cyclohexane and a small amount of methanol, and a fourth phase containing a preponderance of methanol and a minor amount of cyclohexane;
    (g) passing the fourth phase to said fractionation at (d) hereof;
    (h) fractionating said third phase to obtain liquid cyclohexane as a product of the method and as a vapor and azeotrope containing a preponderant amount of cyclohexane, and a minor amount of methanol; and
    (i) passing the last-obtained vaporous azeotrope to condensation and to said second phase separation.

4. A method for the purification and recovery of a carboxy telechelic polybutadiene from its solution in cyclohexane, the solution also containing lithium chloride catalyst residue, which comprises:
    (a) admixing methanol with said solution;
    (b) forming separate phases, a first phase containing said carboxylated polybutadiene, cyclohexane and methanol, and a second phase containing cyclohexane, methanol and catalyst residue;
    (c) flashing the first phase to obtain cyclohexane and alcohol as a vaporous fraction, and said carboxylated polybutadiene, which is recovered as product of the method;
    (d) fractionating the second phase to recover, as a vapor, an azeotrope containing methanol and cyclohexane, and a liquid containing methanol, lithium chloride and a small unavoidable portion of carboxylated polybutadiene;
    (e) further fractionating said liquid to recover methanol as a vapor and an unvaporized liquid containing lithium chloride catalyst residue and said unavoidable portion of carboxylated polybutadiene;
    (f) subjecting said vapor, obtained at (d) hereof to a first condensation and then to a second phase separation, obtaining a third phase containing a large preponderance of cyclohexane and a small amount of methanol, and a fourth phase containing a preponderance of methanol and a minor amount of cyclohexane;
    (g) passing the fourth phase to said fractionation at (d) hereof;
    (h) fractionating said third phase to obtain liquid cyclohexane as a product of the method and as a vapor and azeotrope containing a preponderant amount of cyclohexane, and a minor amount of methanol;

(i) passing the last-obtained vaporous azeotrope to condensation and to said second phase separation;
(j) returning the methanol recovered at step (e) hereof to the admixing step at (a) hereof; and
(k) passing the vaporous fraction obtained at (c) hereof to the fractionating of the third phase at (h) hereof.

5. A method for the purification and recovery of a carboxy telechelic polymer from its solution in a hydrocarbon solvent, the solution also containing an inorganic residue of an organo lithium catalyst which comprises:
(a) admixing with said solution methanol which will form two phases therewith and an azeotrope with said hydrocarbon solvent;
(b) forming separate phases, a first phase containing said polymer, hydrocarbon solvent and methanol, and a second phase containing hydrocarbon solvent, methanol and catalyst residue;
(c) flashing the first phase to obtain hydrocarbon solvent and methanol azeotrope vapors, and said polymer which is recovered as product of the method; and
(d) fractionating the second phase to recover as a vapor, an azeotrope containing methanol and hydrocarbon solvent, and a liquid containing methanol inorganic alkali metal catalyst residue and a small unavoidable portion of said polymer.

6. A method according to claim 5 wherein the liquid containing methanol and said residue is fractionated to recover the methanol as a reuseable stream and an unvaporized liquid containing said small unavoidable portion of said polymer and said residue.

References Cited by the Examiner
UNITED STATES PATENTS

| | | | |
|---|---|---|---|
| 2,356,240 | 6/1944 | Hamlin | 203—63 |
| 2,618,591 | 11/1952 | Anderson | 203—66 |
| 2,631,175 | 3/1953 | Crouch. | |
| 2,913,444 | 11/1959 | Diem | 260—94.2 |
| 2,991,279 | 7/1961 | Miller | 260—94.7 |

NORMAN YUDKOFF, *Primary Examiner.*